United States Patent
Holzapfel

(10) Patent No.: US 6,523,005 B2
(45) Date of Patent: Feb. 18, 2003

(54) METHOD AND CONFIGURATION FOR DETERMINING A DESCRIPTIVE FEATURE OF A SPEECH SIGNAL

(75) Inventor: Martin Holzapfel, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/950,434

(22) Filed: Sep. 10, 2001

(65) Prior Publication Data

US 2002/0035469 A1 Mar. 21, 2002

Related U.S. Application Data

(63) Continuation of application No. PCT/DE00/00597, filed on Mar. 1, 2000.

(30) Foreign Application Priority Data

Mar. 8, 1999 (DE) .......................... 199 10 038

(51) Int. Cl.[7] .............................................. G10L 15/14
(52) U.S. Cl. ...................................... 704/256; 704/255
(58) Field of Search .............................. 704/200, 263, 704/260, 256, 257, 255, 251

(56) References Cited

U.S. PATENT DOCUMENTS 5,754,978 A    5/1998   Pérez-Méndez et al. .... 704/255
6,223,155 B1 * 4/2001   Bayya ........................ 704/243
6,272,463 B1 * 8/2001   Lapere ....................... 704/243
6,343,267 B1 * 1/2002   Kuhn et al. ................. 704/222

FOREIGN PATENT DOCUMENTS

DE   197 06 516 C 1    1/1998   ............. G10L/3/02
WO   WO 99/45530       9/1999   ............. G10L/5/06

OTHER PUBLICATIONS

Proceedings of the IEEE, vol. 86, No., 11. Katagiri et al., Pattern Recognition Using a Family of design algorithm based upon the generalized probabilistic descent method: Nov. 1998.*
Hervé Bourlard et al.: "Multi–Stream Speech Recognition", IDIAP Research Report, Dec. 1996, pp. 2–13.
Ernst Günter Schukat–Talamazzini: "Automatische Spracherkennung" (automatic speech recognition), pp. 45–74.
Jiantning Song et al.: A robust speaker–independent isolated word HMM recognizer for operation over the telephone network, Speech Communication 13 (1993), pp. 287–295.

* cited by examiner

Primary Examiner—Richemond Dorvil
(74) Attorney, Agent, or Firm—Laurence A. Greenberg; Werner H. Stemer; Ralph E. Locher

(57) ABSTRACT

A method and also a configuration for determining a descriptive feature of a speech signal, in which a first speech model is trained with a first time pattern and a second speech model is trained with a second time pattern. The second speech model is initialized with the first speech model.

12 Claims, 2 Drawing Sheets

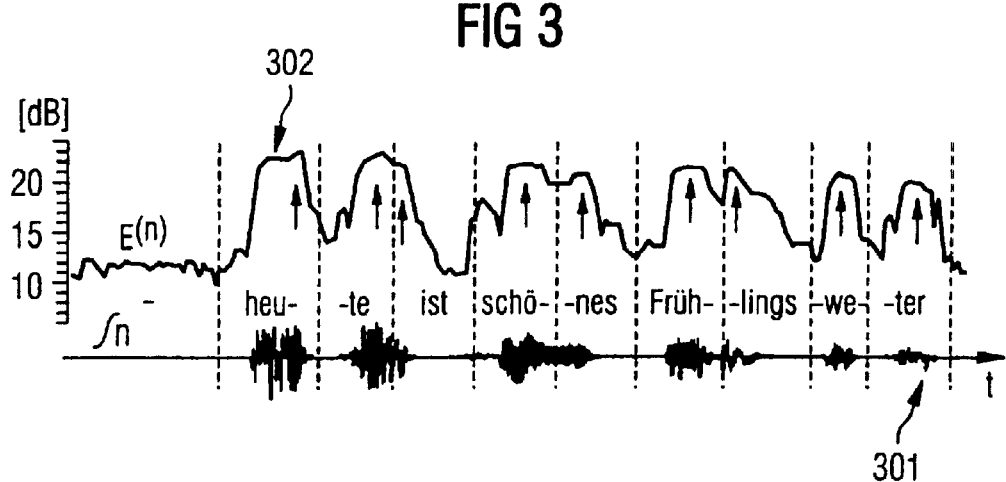
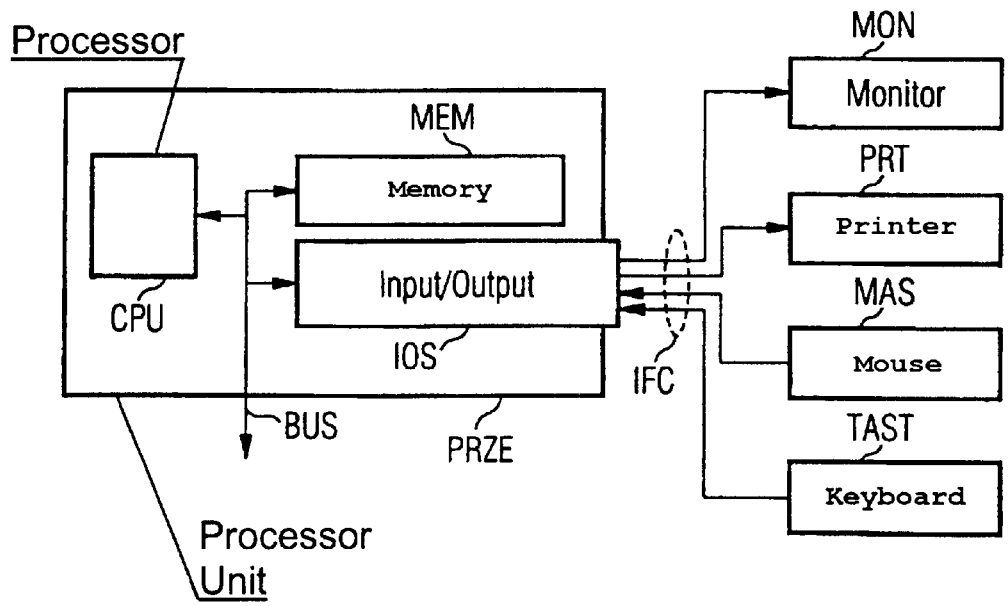

METHOD AND CONFIGURATION FOR DETERMINING A DESCRIPTIVE FEATURE OF A SPEECH SIGNAL

CROSS-REFERENCE TO RELATED APPLICATION

This application is a continuation of copending International Application No. PCT/DE00/00597, filed Mar. 1, 2000, which designated the United States.

BACKGROUND OF THE INVENTION

Field of the Invention

The invention relates to a method and to a configuration for determining a descriptive feature of a speech signal. Such a method and such a configuration are known from E. G. Schukat-Talamazzini: Automatische Spracherkennung-Grundlagen, statistische Modelle und effiziente Algorithmen [Automatic speech recognition—fundamentals, statistical models and efficient algorithms], Vieweg & Sohn Verlagsgesellschaft mbH, Braunschweig/Wiesbaden 1995, pages 45–74. There, the extraction of a discrete time sequence of feature vectors from the speech signal pursues several goals: the digital representation of the speech sound; the reduction of the data volume; the emphasizing of variable attributes which are helpful in identifying the utterance content (of the spoken sounds and words); and the removal of variable attributes which characterize the speaker, the accent, environmental influences and acoustic and electric transmission properties.

In general, feature vectors of relevant pattern classes of the field of application are to occupy compact zones of the feature space, and it is to be possible to separate the zones of different pattern classes from one another as sharply as possible. Known techniques of obtaining features are predominantly based on the combination of methods from digital signal processing, in particular series expansions, with functional models for the production or perception of speech.

After being picked up, the sound wave is present in the form of an electric signal which is described by a real, continuous target function $\tilde{f}(t)$. The range of definition and the range of values of the signal must be discretized for the purpose of further processing on a computer. Sampling the target function $\tilde{f}(t)$ at discrete interpolation points leads to loss of information. However, if $\tilde{f}(t)$ satisfies a spectral band limitation, the function can be reconstructed from its samples if the sampling frequency is selected to be sufficiently high.

Sound waves are nonstationary signals, their spectral properties vary from sound to sound. Even intraphonetically, the dynamics of the articulation gestures effect continuous (in the case of diphthongs) and abrupt (in the case of plosives and affricates) variations in the sound structure. The speech signal can be regarded as approximately stationary only over very short time intervals lasting approximately 5–30 ms.

It is not necessary to calculate short-term features of the speech signal at each sampling instance m. A windowed segment of the speech signal of the order of magnitude of 25 ms is moved through the speech signal at an advancing time of 10 ms. A feature vector is produced in this case for each instant of 10 ms. At each 10 ms instant, the values of the data window (25 ms) are analyzed for their spectral and periodic properties and are stored in the form of the feature vector.

Hidden Markov models (HMM) for modeling sounds are also known from E. G. Schukat-Talamazzini: Automatische Spracherkennung-Grundlagen, statistische Modelle und effiziente Algorithmen [Automatic speech recognition—fundamentals, statistical models and efficient algorithms], Vieweg & Sohn Verlagsgesellschaft mbH, Braunschweig/Wiesbaden 1995, pages 125–139. As a word is being produced in speech, the constituent sounds are realized with a variable duration and in a different spectral composition. A number of feature vectors which cannot be predicted occurs for each individual phonetic segment of the utterance, depending on the rate and rhythm of speech. In addition to its phonetic content, each vector also includes information components conditioned by the speaker, environment and slurring, and these substantially complicate phonetic identification.

These relationships can be modeled in a simplified fashion by a two-stage process as is shown in FIG. 1 using, as an example, the German word "haben". Reserved in the model for the phonemes of the word is a corresponding number of states 102 to 106 which are run through in the direction of the arrow 101 to produce speech. With each time cycle, it is possible to remain in the current state or to make a transition to the successor state. The system behaves statistically and is determined by the transition probabilities 107 to 111 illustrated. Thus, the state 103 belonging to the phoneme /a/ is adopted over a plurality (on average over ten) of successive short-term analysis intervals, whereas realizations of the plosive /b/ require less time.

Whereas the described first stage of the random process models the temporal distortion of different variant pronunciations, a second stage serves to detect spectral variations. Each state of the word model is associated with a statistical output function which weights the phonetic alternative realizations. In the example of FIG. 1, in addition to the actual matching phonetic class 113, the phonetic class 114 with a positive probability (here: 0.1) is permitted for producing the phoneme /a/. The phonetic class 118 for producing the phoneme /n/ with a probability of 0.3 is also permitted. The described formalism also allows for description of an optional sound elimination, expressed by the "bridging" 119 of the state 105 by a direct transition between the states 104 and 106. The bridge is assigned with a probability of 0.2, for example. The transition probabilities of the hidden Markov model can be determined using training data. The finally trained HMM then constitutes a rule for producing sound sequences (compare E. G. Schukat-Talamazzini: Automatische Spracherkennung-Grundlagen, statistische Modelle und effiziente Algorithmen [Automatic speech recognition—fundamentals, statistical models and efficient algorithms], Vieweg & Sohn Verlagsgesellschaft mbH, Braunschweig/Wiesbaden 1995, pages 127–139). One method for training the HMM is to use the Baum-Welch algorithm.

It may be remarked in this regard that a trained HMM can be used both for speech recognition, that is to say to compare a natural-speech utterance with the model, and for speech synthesis, that is to say to produce a sound with the aid of the training data.

The 10 ms segments for feature vectors mentioned at the beginning are not sufficient, in particular, for speech synthesis. However, with the known mechanisms, a much finer temporal subdivision leads to a lack of convergence in the HMM training.

SUMMARY OF THE INVENTION

It is accordingly an object of the invention to provide a configuration and a method for determining a descriptive feature of a speech signal which overcomes the above-mentioned disadvantageous of the prior art apparatus and methods of this general type. In particular, it is an object of the invention to obtain a descriptive feature of a speech signal which still supplies meaningful features at a high sampling rate.

With the foregoing and other objects in view there is provided, in accordance with the invention, a method for determining a descriptive feature of a speech signal, that includes steps of: training a first speech model with a first time pattern; training a second speech model with a second time pattern; and initializing the second speech model with the first speech model.

In accordance with an added feature of the invention, the second time pattern is smaller than the first time pattern.

One advantage consists in that, because of the initialization with the knowledge gained from the first speech model, the second speech model also converges for a very small second time pattern, and thus correspondingly highly resolving information of the speech signal is available.

This information is useful precisely for speech synthesis, since the transition, which is difficult to synthesize, between the sounds is more accurately modeled by the higher (temporal) resolution.

Generally, in this case time pattern is understood as the repetition rate at which sampling of the speech signal is performed or at which the time window (specified at the beginning as having a width of 25 ms) is displaced.

In accordance with an additional feature of the invention, the second speech model is initialized with segment boundaries of the first speech model. In the course of the training of the first speech model, which is preferably a hidden Markov model (HMM), a multiplicity of possible representatives are found for the sound /a/, for example. These representatives prescribe a first coarse segmentation for the sound /a/. These sounds serve the second speech model as a basis, in which case, because of the second time pattern, a higher temporal resolution permits a more precise distinction of the representatives for the sound /a/ which were found by means of the first speech model. The renewed training therefore converges and ensures, moreover, a substantially improved distinguishability and/or describability of the sounds in comparison with the first speech model.

In accordance with another feature of the invention, the speech model is an HMM, in which case, in particular, the segment boundaries for the initialization of the second speech model constitute a result of the HMM training.

In accordance with a further feature of the invention, the descriptive feature is a feature vector.

In accordance with a further added feature of the invention, the first time pattern is situated in a range between 4 ms and 10 ms.

In accordance with a further additional feature of the invention, the second time pattern can correspondingly be greater than zero and can run up to 6 ms.

In accordance with yet an added feature of the invention, the described method is used in speech processing, in particular, in speech synthesis.

An essential task during the speech synthesis is for suitable sound boundaries to be determined ("cut out") from training material (spoken text) which is mostly comprehensive. Different sounds can be taken into account in this process: phonemes, diphones, triphones, half syllables, syllables, words, word combinations, etc. In particular, the individual sounds can be cut out with regard to their context.

It is possible in this case to distinguish a left context from a right context, which can in each case be combined with the sound in themselves or in combination at a different length. As one example (word context) of this: consideration is given to the word "Ermittlung" in the German sentence "Verfahren zur Ermittlung einer Merkmals-beschreibung eines Sprachsignals". The right context with the length 1 includes the word "einer", the word "zur" correspondingly holding for the left context (length=1). Further contexts of different length can also be considered correspondingly.

In accordance with the length of the sound units and the contexts respectively to be considered, it is significant when segmenting precisely to be able to determine the boundaries between the sounds.

With the foregoing and other objects in view there is provided, in accordance with the invention, a configuration for determining a descriptive feature of a speech signal. The configuration includes a processor unit that is configured for training a first speech model with a first time pattern; training a second speech model with a second time pattern; and initializing the second speech model with the first speech model.

This configuration is particularly suitable for carrying out the method according to the invention or one of its developments explained above.

Other features which are considered as characteristic for the invention are set forth in the appended claims.

Although the invention is illustrated and described herein as embodied in a method and configuration for determining a descriptive feature of a speech signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a graph of a speech signal shown over time for the purpose of illustrating a feature extraction and/or segmentation; and FIG. 4 is a processor unit.

DESCRIPTION OF THE PREFERRED EMBODIMENTS

Figure 1:
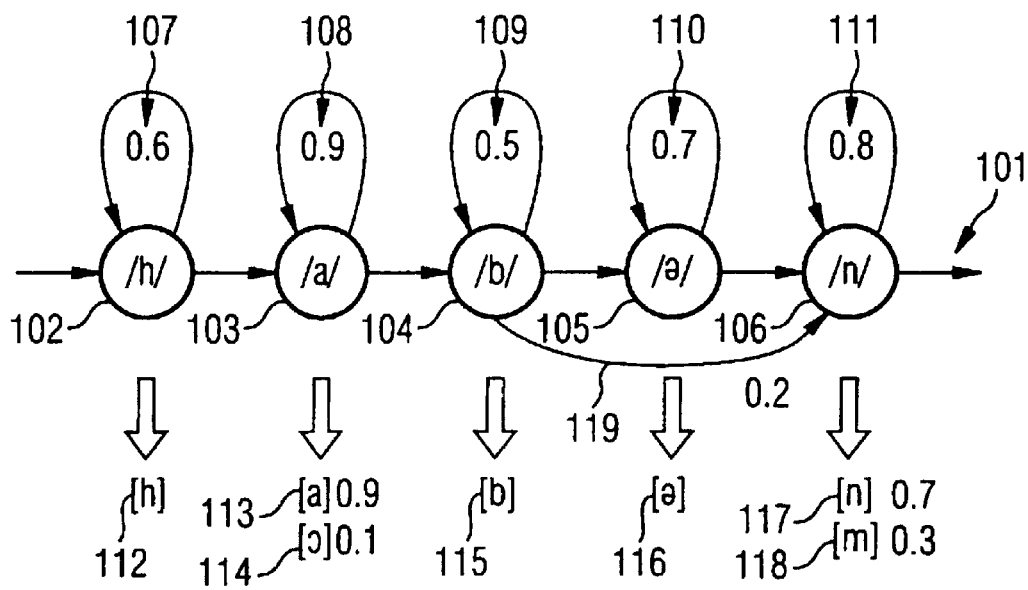
FIG. 1 is a sketch for speech modeling using HMM.
Figure 2:
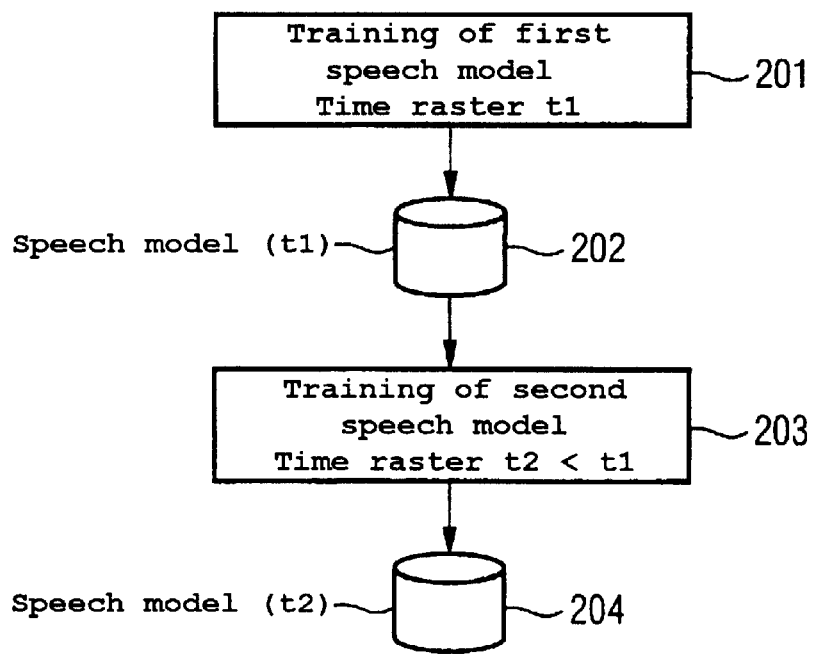
FIG. 2 is a block diagram showing a method for determining a descriptive feature of a speech signal.

Referring now to the figures of the drawing in detail and first, particularly, to FIG. 2 thereof, there is shown a block diagram which illustrates the mode of operation of a method for determining a descriptive feature of a speech signal. A first speech model is trained for a prescribed first time pattern t1 in step 201. In this process, a training material of naturally spoken text is used to train the hidden Markov models. A feature vector is determined at each sampling instant (in particular, let t1=6 ms) from the speech signal and is used to train the HMM. A first speech model 202 is present upon the conclusion of HMM training. This speech model 202 can be used to identify sounds whose segment boundaries (that is to say their segments in the speech signal which were determined in the first speech model) serve as initialization for a second HMM training. This second speech model is based on a second time pattern t2, in which case it holds that t2<t1 (in particular, let t2=2 ms). Because of the initialization of the second HMM training with the identified segments from the first training, the second speech model 204 also converges. The result is therefore a speech model 204 with a substantially higher temporal resolution, and in the case of which, it is ensured that sensible training is performed despite the high resolution.

A speech signal 301 is plotted against time t in FIG. 3. The speech signal illustrates the German sentence "Heute ist sch önes Frühlingswetter". It may be seen from the profile of the speech signal that the segmentation of the sound boundaries is nontrivial. In particular, the described extraction of information from short segments—characterizing the sound transition—permits automated extraction. FIG. 3 also illustrates an energy profile 302 from which it is possible to extract information taken up into the feature vector (see FIG. 2).

A processor unit PRZE is illustrated in FIG. 4. The processor unit PRZE includes a processor CPU, a memory SPE, and an input/output interface IOS which is used in a different way via an interface IFC: a graphics interface is used to visualize an output on a monitor MON and/or to output it on a printer PRT. An input is made via a mouse MAS or a keyboard TAST. The processor unit PRZE also has a data bus BUS which ensures connection of a memory MEM, the processor CPU and the input/output interface IOS. It is possible, furthermore, to connect additional components to the data bus BUS, such as, for example, an additional memory, a data storage device (hard disk) or a scanner.

I claim:

1. A method for determining a descriptive feature of a speech signal, which comprises:

training a first speech model with a first time pattern;

training a second speech model with a second time pattern; and using the first speech model to initialize the training of the second speech model.

2. The method according to claim 1, which comprises providing the second time pattern to be smaller than the first time pattern.

3. The method according to claim 1, wherein the step of initializing the second speech model includes initializing the second speech model with segment boundaries of the first speech model.

4. The method according to claim 1, which comprises providing the first speech model as a hidden Markov model.

5. The method according to claim 4, which comprises determining segment boundaries of the first speech model by training the hidden Markov model.

6. The method according to claim 1, which comprises providing the second speech model as a hidden Markov model.

7. The method according to claim 1, which comprises providing a descriptive feature as a feature vector.

8. The method according to claim 1, which comprises situating the first time pattern in a range between 4 ms and 10 ms.

9. The method according to claim 1, which comprises situating the second time pattern in a range greater than zero and running up to 6 ms.

10. The method according to claim 1, which comprises performing the training steps and the initialization step in a system for speech processing.

11. The method according to claim 1, which comprises performing the training steps and the initialization step in a system for speech synthesis.

12. A configuration for determining a descriptive feature of a speech signal, comprising a processor unit configured for:

training a first speech model with a first time pattern;

training a second speech model with a second time pattern; and initializing the training of the second speech model with the first speech model.

* * * * *